United States Patent
Fechner et al.

(10) Patent No.: US 12,525,003 B2
(45) Date of Patent: Jan. 13, 2026

(54) METHOD AND SYSTEM FOR DETERMINING GROUND LEVEL USING AN ARTIFICIAL NEURAL NETWORK

(71) Applicants: AUMOVIO Autonomous Mobility Germany GmbH, Ingolstadt (DE); Volkswagen AG, Wolfsburg (DE)

(72) Inventors: Thomas Fechner, Nuremberg (DE); Stefan Heinrich, Nuremberg (DE); Dieter Krökel, Nuremberg (DE); Heiko Gustav Kurz, Hannover (DE)

(*) Notice: Subject to any disclaimer, the term of this patent is extended or adjusted under 35 U.S.C. 154(b) by 2 days.

(21) Appl. No.: 17/705,835

(22) Filed: Mar. 28, 2022

(65) Prior Publication Data
US 2022/0309776 A1    Sep. 29, 2022

(30) Foreign Application Priority Data
Mar. 29, 2021   (DE) .......................... 102021107904.7

(51) Int. Cl.
*G06V 10/82* (2022.01)
*B60R 1/22* (2022.01)
(Continued)

(52) U.S. Cl.
CPC ............... *G06V 10/82* (2022.01); *B60R 1/22* (2022.01); *G06T 7/593* (2017.01); *G06T 7/85* (2017.01);
(Continued)

(58) Field of Classification Search
None
See application file for complete search history.

(56) References Cited

U.S. PATENT DOCUMENTS

| | | | |
|---|---|---|---|
| 6,473,689 B1 * | 10/2002 | Egberts | G01C 21/28 |
| | | | 342/359 |
| 6,996,507 B1 * | 2/2006 | Myr | G06Q 10/06 |
| | | | 703/2 |

(Continued)

FOREIGN PATENT DOCUMENTS

| | | | | |
|---|---|---|---|---|
| CN | 109941286 A | * | 6/2019 | ............ B60W 30/12 |
| DE | 19926559 A1 | | 4/2013 | |

(Continued)

OTHER PUBLICATIONS

Yongtae Do, "Application of neural networks for stereo-camera calibration," IJCNN'99. International Joint Conference on Neural Networks. Proceedings (Cat. No. 99CH36339), Washington, DC, USA, 1999, pp. 2719-2722 vol.4, doi: 10.1109/IJCNN.1999.833509. (Year: 1999).*

(Continued)

*Primary Examiner* — Stefan Gadomski
(74) *Attorney, Agent, or Firm* — Christensen O'Connor Johnson Kindness PLLC

(57) ABSTRACT

A method for determining the roadway plane in the surrounding area of a vehicle, the vehicle comprising a stereo camera system for capturing stereo images of the surrounding area of the vehicle and an artificial neural network for processing the image information provided by the stereo camera system, wherein the neural network determines disparity information of the surrounding area of the vehicle, wherein, on the basis of the disparity information, distance information is calculated which contains information regarding the distance of the objects displayed on the image information from the stereo camera system or the vehicle, wherein roadway distance information is extracted from the distance information, wherein the roadway plane is determined on the basis of the roadway distance information.

16 Claims, 2 Drawing Sheets

(51) Int. Cl.
  *G06T 7/593* (2017.01)
  *G06T 7/80* (2017.01)
  *G06V 10/764* (2022.01)
  *G06V 20/56* (2022.01)
  *H04N 13/00* (2018.01)
  *H04N 13/128* (2018.01)
  *H04N 13/204* (2018.01)

(52) U.S. Cl.
  CPC .......... *G06V 10/764* (2022.01); *G06V 20/588* (2022.01); *H04N 13/128* (2018.05); *H04N 13/204* (2018.05); *G06T 2200/04* (2013.01); *G06T 2207/10012* (2013.01); *G06T 2207/20084* (2013.01); *G06T 2207/20224* (2013.01); *G06T 2207/30244* (2013.01); *G06T 2207/30256* (2013.01); *G06T 2207/30261* (2013.01); *H04N 2013/0081* (2013.01)

(56) References Cited

U.S. PATENT DOCUMENTS

| | | | | |
|---|---|---|---|---|
| 10,187,630 | B2* | 1/2019 | Yoo | H04N 13/239 |
| 10,380,753 | B1* | 8/2019 | Csordás | G06V 10/52 |
| 10,832,061 | B2* | 11/2020 | Kakegawa | G08G 1/16 |
| 11,343,485 | B1* | 5/2022 | Pighi | B60R 11/04 |
| 11,494,538 | B1* | 11/2022 | King | G06F 30/15 |
| 2008/0133066 | A1* | 6/2008 | Takenaka | B62D 6/003 701/1 |
| 2008/0273757 | A1* | 11/2008 | Nakamura | G06V 20/56 382/104 |
| 2010/0299109 | A1* | 11/2010 | Saito | G06V 20/588 703/2 |
| 2012/0035846 | A1* | 2/2012 | Sakamoto | G01S 13/867 701/301 |
| 2013/0158871 | A1* | 6/2013 | Joh | G01C 21/28 703/2 |
| 2014/0267630 | A1* | 9/2014 | Zhong | G06V 20/588 348/46 |
| 2016/0196654 | A1* | 7/2016 | Aoki | G06V 20/58 382/103 |
| 2018/0059679 | A1 | 3/2018 | Taimouri et al. | |
| 2018/0239969 | A1* | 8/2018 | Lakehal-ayat | G05D 1/0246 |
| 2018/0268229 | A1* | 9/2018 | Nakata | B60W 40/02 |
| 2019/0026568 | A1* | 1/2019 | Kario | G06T 7/75 |
| 2019/0102602 | A1* | 4/2019 | Uchida | G08G 1/165 |
| 2019/0156502 | A1* | 5/2019 | Lee | G06T 7/11 |
| 2019/0158813 | A1* | 5/2019 | Rowell | H04N 13/111 |
| 2019/0272435 | A1* | 9/2019 | Kundu | G06V 20/588 |
| 2019/0279386 | A1* | 9/2019 | Motohashi | G06V 20/56 |
| 2019/0325595 | A1* | 10/2019 | Stein | G06V 10/82 |
| 2019/0382141 | A1* | 12/2019 | Kerr | B64U 80/25 |
| 2020/0033937 | A1* | 1/2020 | Erivantcev | G06T 7/246 |
| 2020/0041650 | A1* | 2/2020 | Matsui | G01S 7/4817 |
| 2020/0074661 | A1* | 3/2020 | Anisimovskiy | H04N 13/239 |
| 2020/0081105 | A1* | 3/2020 | Zhou | G06T 7/80 |
| 2020/0089232 | A1* | 3/2020 | Gdalyahu | G01C 21/3889 |
| 2020/0090323 | A1* | 3/2020 | Li | G06T 7/0002 |
| 2020/0183411 | A1* | 6/2020 | Oba | B60W 60/0057 |
| 2020/0184233 | A1* | 6/2020 | Berberian | G06V 20/588 |
| 2020/0210726 | A1 | 7/2020 | Yang et al. | |
| 2020/0241695 | A1* | 7/2020 | Ikeda | G06F 3/042 |
| 2020/0241697 | A1* | 7/2020 | Ikeda | G06F 3/0304 |
| 2020/0242925 | A1* | 7/2020 | Momose | G08G 1/0112 |
| 2020/0279391 | A1* | 9/2020 | Gross | G06T 7/73 |
| 2020/0327343 | A1* | 10/2020 | Lund | H04W 4/46 |
| 2020/0329215 | A1* | 10/2020 | Tsunashima | G06T 7/593 |
| 2020/0333453 | A1* | 10/2020 | Mende | G01S 13/38 |
| 2020/0349362 | A1* | 11/2020 | Maloney | G01S 5/16 |
| 2020/0349366 | A1* | 11/2020 | Takemura | H04N 13/286 |
| 2020/0349391 | A1* | 11/2020 | Zhang | G06F 18/2148 |
| 2021/0058598 | A1* | 2/2021 | Sadasue | G06T 7/32 |
| 2021/0122364 | A1* | 4/2021 | Lee | B60W 10/04 |
| 2021/0166043 | A1* | 6/2021 | Reiche | G06V 20/58 |
| 2021/0201515 | A1* | 7/2021 | Burstein | G06T 17/05 |
| 2021/0389469 | A1* | 12/2021 | Sakata | B60W 50/14 |
| 2022/0082403 | A1* | 3/2022 | Shapira | G01C 21/3848 |
| 2022/0101549 | A1* | 3/2022 | Sadeghi | G06V 20/58 |
| 2023/0003548 | A1* | 1/2023 | Schwartz | G01C 21/3889 |
| 2023/0175852 | A1* | 6/2023 | Shambik | G06V 20/588 701/28 |
| 2023/0296408 | A1* | 9/2023 | Viala | G01C 25/00 702/94 |

FOREIGN PATENT DOCUMENTS

| | | |
|---|---|---|
| DE | 102012018471 A1 | 4/2013 |
| DE | 102015200434 A1 | 7/2016 |
| DE | 102016014783 A1 | 7/2017 |
| DE | 102017120112 A1 | 3/2018 |
| JP | 2019067115 A | 4/2019 |
| WO | 2018050224 A1 | 3/2018 |

OTHER PUBLICATIONS

Search Report mailed Sep. 8, 2021, issued in corresponding German Application No. 102021107904.7, filed Mar. 29, 2021, 10 pages.
European Search Report mailed Aug. 29, 2022, issued in corresponding European Application No. 22 163 978.4, 9 pages.
Wang, Q., et al., "FADNet: A Fast and Accurate Network for Disparity Estimation," 2020 IEEE International Conference On Robotics And Automation (ICRA), IEEE, May 31, 2020, pp. 101-107.
Office Action mailed Jul. 11, 2024, issued in corresponding European Application No. 22 163 978.4, 8 pages.
Office Action mailed Dec. 27, 2024, issued in corresponding Chinese Application No. 202210310930.1, 22 pages.
Office Action mailed Jul. 18, 2025, issued in corresponding Chinese Application No. 202210310930.1, filed Mar. 28, 2022, 15 pages.

* cited by examiner

METHOD AND SYSTEM FOR DETERMINING GROUND LEVEL USING AN ARTIFICIAL NEURAL NETWORK

CROSS-REFERENCE TO RELATED APPLICATION

This application claims priority to German Application Number 10 2021 107 904.7, filed Mar. 29, 2021, the disclosure of which is hereby incorporated by reference.

FIELD

The invention relates to a method and a system for determining the roadway plane in the surrounding area of a vehicle as well as to a vehicle having a system of this type.

BACKGROUND

Autonomous driving functions require sensor systems that can reliably detect even small obstacles at large distances. LIDAR systems or stereo camera systems can be used to detect such obstacles since these systems offer the possibility of imaging the environment in three dimensions. In this way, the size and distance of the obstacles and the free space can be detected at the same time. Stereo camera systems have the advantage that they have a significantly higher lateral resolution than LIDAR systems while LIDAR systems allow a very precise determination of the distance.

Particular importance in autonomous driving functions is attached to the identification of obstacles on the roadway. In particular, it is important to be able to distinguish, for example, whether there is merely a small object on the roadway that can be driven over or whether there is an obstacle that cannot be driven over and thus an emergency braking or evasive maneuver has to be initiated.

For this purpose, it is important to be able to determine as accurately as possible the height of an object that is on the roadway, even at a distance from the car of e.g. 35 m or more, in order to have sufficient time to initiate an emergency braking or an evasive maneuver.

A problem with the use of LIDAR sensors is that, although they offer a high distance resolution, the laser beams are totally reflected by the roadway from a distance of about 35 m, so that it is no longer possible to detect the plane of the roadway.

The problem with the stereo camera systems known to date is that they have a high signal-to-noise ratio, which means that the roadway plane or objects on the roadway plane can only be determined inadequately.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Based on this, an object of the present disclosure is to provide a method for determining the roadway plane in the surrounding area of a vehicle, which allows a reliable and highly accurate determination of the roadway plane.

This object is achieved by one or more embodiments of the present disclosure, which include a method, a system for determining the roadway plane in the surrounding area of a vehicle, and a vehicle including a system of this type.

According to a first aspect, the present disclosure relates to a method for determining the roadway plane in the surrounding area of a vehicle. The vehicle includes a stereo camera system for capturing stereo images of the surrounding area of the vehicle. The stereo camera system comprises at least two cameras provided at different positions of the vehicle. In order to increase the accuracy when determining the distance, the cameras are preferably spaced apart from each other at a distance greater than 0.8 m, in particular greater than 1 m. Preferably, the cameras are integrated on the windshield or one camera is integrated in each headlight. In addition, the vehicle comprises an artificial neural network that processes the image information provided by the stereo camera system. The neural network receives the image information from the cameras and determines disparity information for this image information. In particular, the disparity information indicates the distance that corresponding pixels of the image information of the two cameras have. This distance results from the different viewing angle of the scene area that this pixel represents and the resulting parallax. On the basis of the disparity information, distance information is calculated that contains information regarding the distance of the objects shown on the image information from the stereo camera system or the vehicle. Generally speaking, the distance information indicates the depth at which the object shown is located with respect to the vehicle. In this case, the distance or depth can refer to different reference points, for example a reference point of the stereo camera system or a reference point of the vehicle. Roadway distance information is then extracted from the distance information. In particular, this means that, by means of information limitation, the entire distance information is narrowed down to information that relates to the roadway. It should be noted, however, that the roadway distance information does not have to contain only roadway distance information but may also contain information regarding the distance from other objects, in particular non-static objects.

Finally, the roadway plane is determined on the basis of the roadway distance information; here determining can also mean estimating the roadway plane.

The technical advantage of the proposed method consists in that by estimating the disparity by the neural network, low-noise disparity information and thus accurate distance information can be determined, which also makes possible distance information in a distance range greater than 35 m relative to the vehicle. By extracting the roadway distance information and determining the roadway plane on the basis of this roadway disparity information, improved identifiability of obstacles on the roadway becomes possible.

According to an exemplary embodiment, the extraction of the roadway distance information from the distance information is performed on the basis of object information that is provided by an environment model of a driving assistance system of the vehicle. The environment model of the vehicle contains e.g. objects that have been detected and/or classified by an in-vehicle sensor system and/or are provided by a map. The objects can be, for example, vehicles, houses, pedestrians, cyclists, etc. The roadway distance information can be extracted by removing these objects known from the environment model from the distance information, so that the determination of the roadway plane is not influenced by these objects. This allows a more accurate roadway plane determination.

According to an exemplary embodiment, the roadway plane information is extracted from the distance information by subtracting and/or eliminating information included in an environment model of a driving assistance system of the vehicle from information included in a stereo image or from the distance information contained in the stereo image. The information of the environment model can in turn be objects from the vehicle environment that are contained in the environment model. This in turn allows a more accurate roadway plane determination.

According to an exemplary embodiment, the artificial neural network compensates for calibration inaccuracies resulting from a relative movement of the two cameras of the stereo camera system with respect to each other by a nonlinear correlation of the image information. The artificial neural network is preferably trained to identify and compensate for the calibration of the cameras of the stereo camera system from the identified disparity. For this purpose, the neural network is supplied with image sequences during training, which are recorded from different viewing directions and are suitably labeled, i.e. disparity information and/or distance information is available for the individual pixels in each case. As a result, the weighting factors of the neural network can be selected so as to minimize the error between the identified disparity and the disparity predetermined by the training data or the error between the distance information determined by the neural network and the distance information of the training data.

According to an exemplary embodiment it is checked on the basis of the roadway plane whether objects are present on the roadway in the surrounding area of the vehicle. For example, it is determined on the basis of the roadway plane and the distance information provided by the stereo camera system whether the stereo images contain at least one area which protrudes upward from the roadway plane and therefore could represent an object or an obstacle. It is thus possible to perform object identification of objects on the roadway surface on the basis of the detected roadway plane.

According to an exemplary embodiment, the size of an object and/or the height of an object in the roadway area is checked on the basis of the information regarding the roadway plane. For example, the height of an object can be checked by how far the object projects upward from the determined roadway plane. The size of the object can be determined on the basis of the detected lateral width and/or depth (i.e. the dimension into the image plane). The size or height of the object can be used to determine whether the object can be driven over or whether an evasive action or emergency braking maneuver has to be initiated.

According to an exemplary embodiment, the height of an identified object, i.e. the geometric information of how far the object protrudes from the roadway plane, is used to classify the object. The classification can, for example, indicate the object type and/or object size, or mark the object as able to drive over or not able to drive over. On the basis of the classification, it is possible for the driving assistance system to make classification-dependent decisions.

According to an exemplary embodiment, the artificial neural network is retrained on the basis of information from stereo images acquired while the vehicle is in motion and labeled as information associated with the roadway. It is thus possible to retrain the neural network by information obtained during the operation of the system, thereby improving the road plane estimation.

According to an exemplary embodiment, the artificial neural network provides the disparity information and the distance information from the disparity information is calculated in a separate computing unit. This can reduce the complexity of the neural network. Alternatively, the artificial neural network provides the distance information as output information. In this way, the stereo camera system directly provides distance information that can be directly evaluated by the driving assistance system.

According to an exemplary embodiment, the cameras have inertial sensors by means of which changes in the movement of the respective camera can be detected. The inertial sensors can, for example, detect translational movements of the camera in three spatial directions of a Cartesian coordinate system and rotational movements about the three spatial axes of the Cartesian coordinate system. It is thus possible to detect absolute position or orientation changes of the respective camera and changes in the relative position or orientation of the two cameras with respect to each other (extrinsic calibration parameters).

According to an exemplary embodiment, information from the inertial sensors of the cameras is used to perform initial training of the neural network. Preferably, the training data has inertial sensor information that reproduces the position or orientation changes of the cameras. This allows the neural network to be trained to identify and compensate for calibration inaccuracies.

According to an exemplary embodiment, information from the inertial sensors of the cameras is used to detect the position or orientation changes of the cameras during the operation of the stereo camera system and thereby compensate for calibration changes in the stereo camera system. Preferably, the information from the inertial sensors of the cameras is used in an online training to adjust the weighting factors of the neural network to adapt the neural network to the calibration changes.

According to an exemplary embodiment, further information provided by sensors is used to identify and compensate for calibration changes. For example, information provided by a temperature sensor can be used to compensate for temperature-dependent calibration changes.

According to another aspect, the present disclosure relates to a system for identifying the roadway plane in the surrounding area of a vehicle. The system comprises a stereo camera system for capturing stereo images of the surrounding area of the vehicle and an artificial neural network for processing the image information provided by the stereo camera system. The neural network is configured to determine disparity information of the surrounding area of the vehicle. The neural network or a computing unit provided separately from the neural network is configured to calculate, on the basis of the disparity information, distance information which contains information regarding the distance of the objects displayed on the image information from the stereo camera system or the vehicle. Furthermore, the neural network or the computing unit provided separately from the neural network is configured to extract roadway distance information from the distance information and to determine information regarding the roadway plane from the roadway distance information.

According to an exemplary embodiment, the system is designed to receive object information which is provided by an environment model of a driving assistance system of the vehicle. Furthermore, the system is designed to extract the roadway plane information from the distance information on the basis of the object information. The environment model of the vehicle contains, for example, objects detected and/or classified by an in-vehicle sensor system and/or provided by a map. The objects can be, for example, vehicles, houses, pedestrians, cyclists, etc. The roadway distance information can be extracted by removing these objects known from the environment model from the distance information, so that the determination of the roadway plane is not influenced by these objects. This allows the roadway plane to be determined more accurately.

According to an exemplary embodiment, the system is configured to perform the extraction of the roadway distance information from the distance information by subtracting and/or eliminating information included in an environment model of a driving assistance system of the vehicle from information included in a stereo image or from the distance information contained in the stereo image. The information of the environment model can in turn be objects from the vehicle environment that are contained in the environment model. This again allows a more accurate determination of the roadway plane.

According to an exemplary embodiment, the system is configured to check, on the basis of the information regarding the roadway plane, whether objects are present in the surrounding area of the vehicle on the roadway.

According to an exemplary embodiment, the system is configured to check, on the basis of the information regarding the roadway plane, the size of an object and/or the height of an object in the roadway area, the height of an identified object, i.e. the geometric information of how far the object protrudes from the roadway plane, being used to classify the object.

According to a last aspect, the present disclosure relates to a vehicle comprising an above mentioned system according to any of the exemplary embodiments.

The expressions "approximately", "substantially" or "about" signify in the sense of the present disclosure deviations from the respectively exact value by +/-10%, preferably by +/-5% and/or deviations in the form of changes that are insignificant for the function.

Further developments, advantages and possible applications of the present disclosure also result from the following description of exemplary embodiments and from the drawings. In this connection, all the features described and/or illustrated are in principle the subject matter of the present disclosure, either individually or in any combination, irrespective of their combination in the claims or their back-reference. In addition, the content of the claims is made a part of the description.

BRIEF DESCRIPTION OF THE DRAWINGS

The present disclosure will be explained in more detail below with reference to the drawings by means of exemplary embodiments. In these drawings.

DETAILED DESCRIPTION

Figure 1:
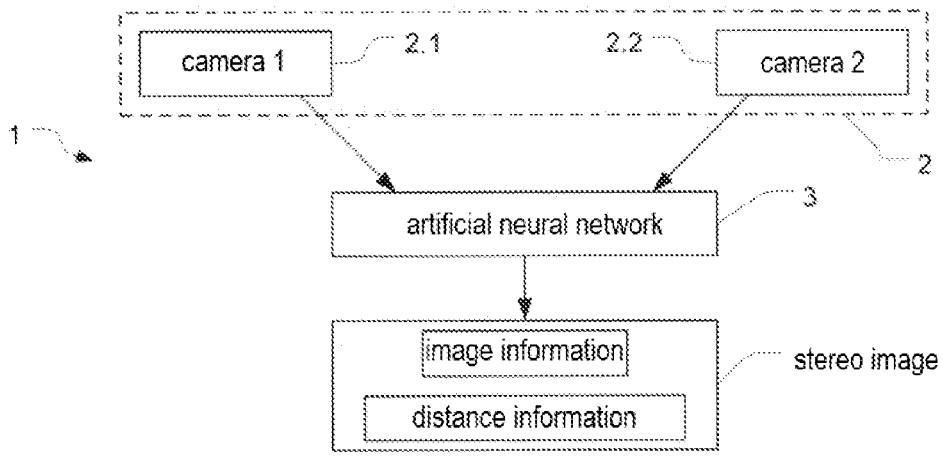
FIG. 1 shows, by way of example, a schematic diagram of a stereo camera system coupled to an artificial neural network for providing stereo images.

FIG. 1 shows, by way of example, a schematic block diagram of a system 1 for determining the roadway plane.

The system includes a stereo camera system 2 comprising at least two cameras 2.1, 2.2. The stereo camera system 2 here captures image information of the vehicle surroundings, in particular of an area in front of the vehicle in the forward driving direction, as image pairs, i.e. at the same points in time one image is captured with the first camera 2.1 and one image is captured with a second camera 2.2 in each case, which images show the same scene but from different viewing directions since the cameras 2.1, 2.2 are arranged at different positions in the vehicle.

For example, the cameras 2.1, 2.2 can be installed in the headlights of the vehicle. Alternatively, the cameras 2.1, 2.2 can also be integrated into the front area of the vehicle or into the windshield. The cameras 2.1, 2.2 preferably have a distance greater than 0.5 m from each other in order to achieve a high distance resolution via a greatest possible base width.

The system also comprises an artificial neural network 3, which is designed to process the image information provided by the stereo camera system 2. The artificial neural network 3 can be, for example, a deep neural network, in particular a convolutional neural network (CNN).

The neural network 3 receives the image information provided by the stereo camera system 2 and estimates disparity information regarding this image information. The disparity information here indicates the amount of the lateral offset between the individual pixels of the image information of an image pair. This lateral offset is a measure of the distance that the scene area represented by the pixel has from the vehicle or from the stereo camera system 2.

The neural network 3 is designed to estimate disparity information while compensating for calibration inaccuracies resulting from a change in the extrinsic parameters of the stereo camera system 2. For this purpose, the neural network 3 is trained by means of training data in which the distance of all pixels from the stereo camera system is known, and the neural network 3 is optimized to identify the disparity.

For example, the neural network 3 uses a nonlinear correlator to determine the disparity information. The neural network 3 receives the image information provided by the stereo camera system 2 and estimates disparity information about this image information. The disparity information here indicates the amount of the lateral offset between the individual pixels of the image information of an image pair. This lateral offset is a measure of the distance that the scene area represented by the pixel has from the vehicle or from the stereo camera system 2. Thus, distance information indicating how far a scene area represented by a pixel is away from the vehicle or from the stereo camera system 2 can be obtained from the disparity information. As a result, the neural network 3 can provide stereo images that also contain distance information about each pixel in addition to two-dimensional image information in the form of pixel-related color values.

The neural network 3 can, for example, be processed in a control device or computing unit of the stereo camera system 2, which may include one or more microcontrollers or processors, memory, or other computing circuitry. Alternatively, the neural network 3 can also be operated in a control device or computing unit provided separately from the stereo camera system 2.

The neural network 3 can be trained by training data, i.e. the weighting factors of the neural network 3 are adjusted by a training phase such that the neural network 3 provides disparity information and/or distance information about the image information acquired by the stereo camera system 2.

The training data (also referred to as ground-truth information) includes pairs of images showing the same scene, each based on different positions and orientations of the cameras 2.1, 2.2. The training data also comprise distance information associated with each image pixel, so that, on the basis of the training data, the error between the calculation result of the neural network 3 and the training data can be determined and the weighting factors of the neural network 3 are successively adjusted in such a way that the error is reduced.

Figure 2:
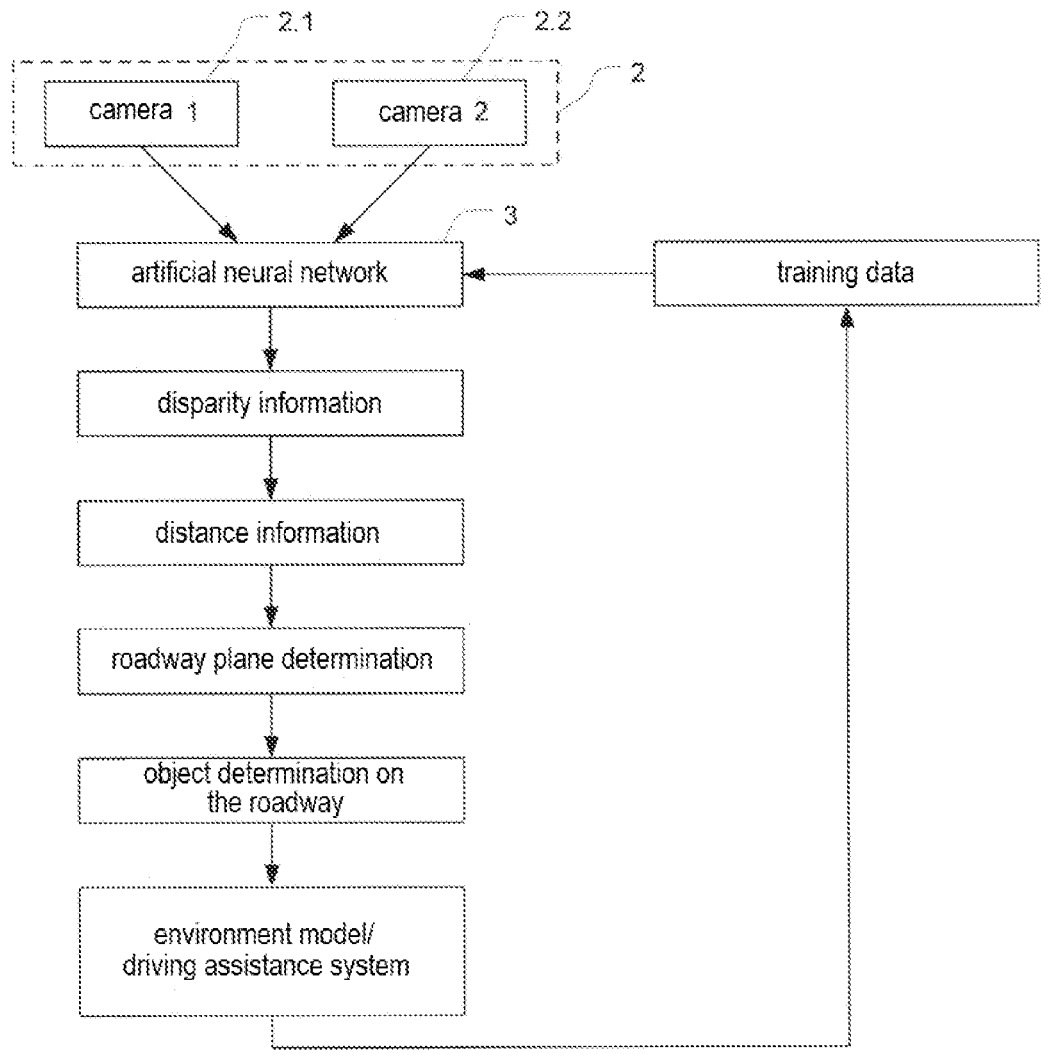
FIG. 2 shows, by way of example and in a schematic manner, a flow chart for determining the roadway plane and identifying objects on the roadway on the basis of the determined roadway plane.

The disparity information provided by the neural network 3 is then used to calculate distance information, as shown in FIG. 2. The distance information is preferably calculated with respect to each pixel of the image information and indicates how far the scene area represented by the pixel is away from the vehicle or the stereo camera system 2.

The stereo image contains information about a roadway area located in front of the vehicle. The roadway area can, for example, also relate inter alia to a roadway area which is more than 35 m in front of the vehicle and which cannot be detected by radar sensors or LIDAR sensors, since the electromagnetic radiation emitted by these sensors experiences total reflection by the roadway surface from a distance of approximately 35 m from the vehicle.

The detection of the roadway area by means of the stereo camera system 2 is advantageous because the roadway plane can be determined by means of the distance information contained in the stereo images. After determining the roadway plane, it can then be analyzed whether certain areas of the stereo image protrude beyond this roadway plane. Such protruding areas can indicate an object or obstacle lying on the roadway, so that after the identification of this object or obstacle and, if necessary, its classification, a decision can be made as to whether this is an obstacle that can be driven over or whether an evasive maneuver must be initiated.

The vehicle preferably has a driving assistance system that provides an environment model containing objects in the surroundings of the vehicle. The environment model can be generated by any sensor system of the vehicle and/or by an access to map information.

Preferably, in order to determine the roadway plane, the objects that are present in the environment model are removed from the stereo images or at least the distance information contained in the stereo images. In other words, roadway distance information is extracted by excluding objects from the environment model from the stereo images or the distance information. As a result, the stereo images or the distance information are reduced with regard to their information content, so that the determination of the roadway plane can be performed more precisely on the basis of the stereo images or distance information reduced with regard to the information content.

The objects can be removed from the environment model, for example, by subtracting environment model information from the stereo images or distance information.

The distance information associated with the roadway surface preferably spans a surface corresponding to the roadway surface.

The determination or estimation of the roadway plane on the basis of the stereo images or the distance information can be performed, for example, by placing a plane on the distance information associated with the roadway in such a way that the total error resulting between the assumed roadway plane and the distance information associated with the roadway is minimized. As a result, a roadway plane can be determined that approximates the roadway surface identified in the stereo images.

If it can be identified from the environment model or the stereo images that the roadway has differently high (e.g. roadway and sidewalk) or differently sloped roadway sections (e.g., oppositely laterally sloped roadway sections), the roadway plane estimation can also be made on the basis of multiple different planes, i.e. the roadway surface is approximated using more than one assumed roadway plane.

After determining the roadway plane, areas of the stereo image can be determined which protrude upward beyond the roadway plane.

Depending on the size of the protruding area and/or the height that this area has with respect to the roadway plane, it can be determined in an analysis step whether it is an object that is located on the roadway. For example, it is possible to specify size or height threshold values that determine how large or how high an area must be in order to be identified as an object or obstacle located on the roadway.

In addition, after an object or obstacle has been identified, it can be classified.

After the identification and, if necessary, classification of an object, information about this object (for example, local position, geometric dimensions, object class, etc.) can be included in the environment model of the vehicle. In this case, the information about this object can be transmitted to a control device of the driving assistance system, which provides this environment model.

As shown in FIG. 2, the artificial neural network 3 can be trained by an online training on the basis of the roadway information obtained. The online training can be performed either continuously or intermittently, for example at certain points in time or after a certain period of time has elapsed.

Information obtained by means of the stereo camera system 2 can be used as training data, or existing training data can be enriched or modified with this information. On the basis of this modified training data, the neural network can then be trained, i.e. the neurons or weighting factors of the neural network are adjusted on the basis of the training data. In other words, the information obtained by means of the stereo camera system 2 is used as the ground-truth data base for retraining the artificial neural network. As a result, the identification of the ground plane can be continuously improved. The cameras 2.1, 2.2 of the stereo camera system 2 can each have inertial sensors.

The inertial sensors are here preferably integrated in the respective camera. The inertial sensors are configured in such a way that based on these inertial sensors movement changes of the cameras 2.1, 2.2 can be detected. For example, the inertial sensors of the respective camera 2.1, 2.2 can detect translational movement changes along three axes of a Cartesian coordinate system and rotational movement changes about these three axes. This makes it possible to track the absolute position or orientation of the respective camera 2.1, 2.2 over time, but also to determine or track the relative position or orientation of the two cameras 2.1, 2.2.

Based on this measurement data, the extrinsic parameters of the stereo camera system 2 and further calibration parameters, for example the base width, can be adjusted. This further ensures a highly accurate online calibration during the operation of the stereo camera system 2 and allows the calculation of highly accurate distance information or a dense depth map independent of the stereo method used.

Furthermore, the measurement data of the inertial sensors of the cameras 2.1, 2.2 can be used to train the neural network 3. Thus, the measured values of the inertial sensors can be provided as input information to the neural network 3 so that the weighting factors of the neural network can be adjusted based thereon and so that the determination of the distance information can be adjusted to the changed orientation of the cameras 2.1, 2.2.

Figure 3:
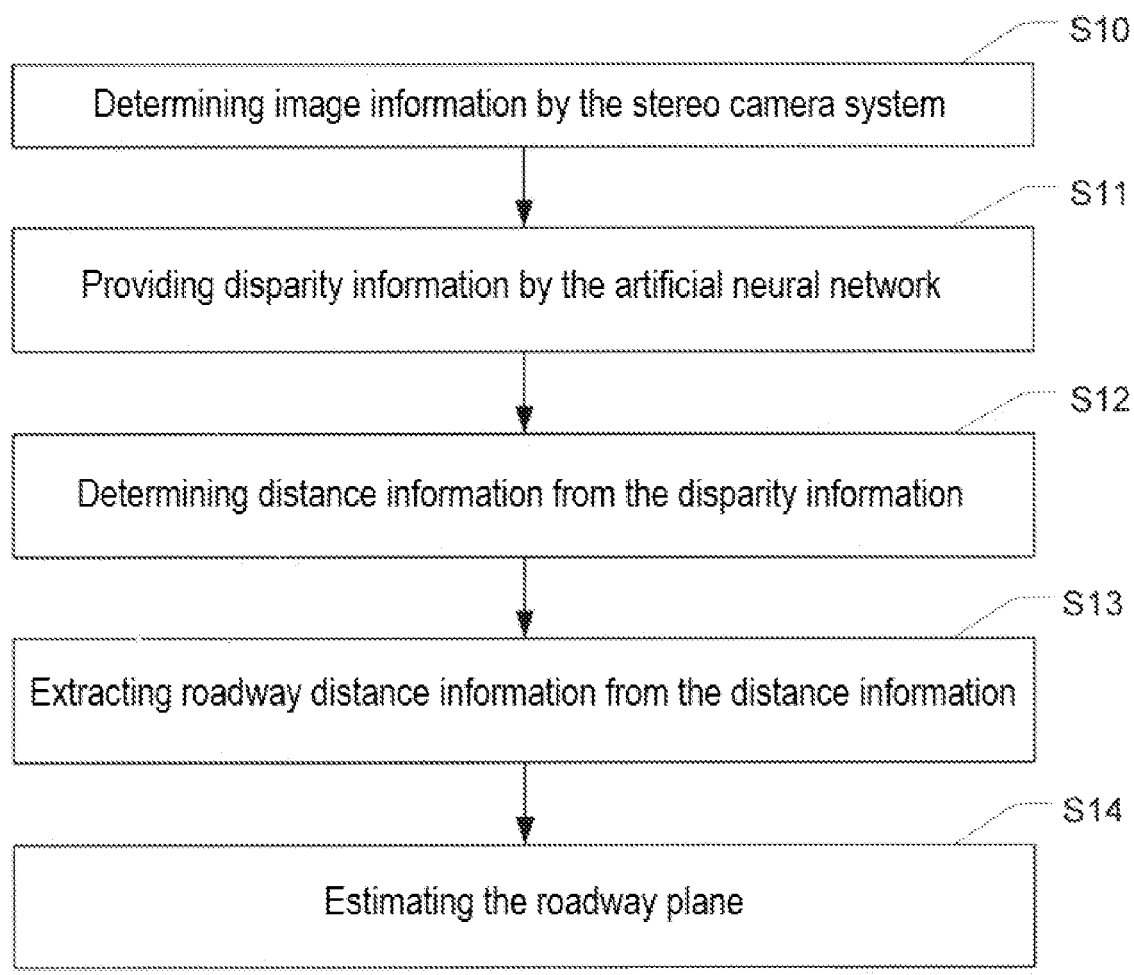
FIG. 3 shows, by way of example, a schematic diagram of the method steps for determining or estimating the roadway plane.

FIG. 3 shows a block diagram that illustrates the steps of a method for determining the roadway plane.

First, image information is acquired by the cameras 2.1, 2.2 of the stereo camera system 2 (S10). The image information is image pairs, where the images of an image pair are acquired at the same time, namely a first image by the first camera 2.1 and a second image by the second camera 2.2.

Then, the neural network determines disparity information of the surrounding area of the vehicle (S11). In particular, the disparity information indicates the distance of corresponding pixels in the images of an image pair, this distance arising due to the different position of the cameras 2.1, 2.2 on the vehicle and the resulting parallax.

Then, on the basis of the disparity information, distance information is calculated, which contains information regarding the distance of the objects displayed on the image information from the stereo camera system 2 or the vehicle (S12).

Subsequently, roadway distance information is extracted from this distance information (S13). In particular, this means that at least some information, which is known not to relate to the roadway, is excluded from the stereo images or the distance information of the stereo images.

Finally, the roadway plane is determined on the basis of the roadway distance information (S14). This can be done in particular by searching for a plane, the geometric position of which in space is selected in such a way that the distance information provided by the stereo camera system 2 has the smallest possible distance from this plane. In particular, the plane can be determined by ensuring that the mean error resulting from the summation of the differences between the distance information provided by the stereo camera system 2 and the plane is at a minimum.

The invention has been described above with reference to exemplary embodiments. It is understood that numerous variations as well as modifications are possible without thereby leaving the scope of protection defined by the patent claims.

LIST OF REFERENCE SIGNS 1 system
2 stereo camera system
2.1, 2.2 camera
3 artificial neural network The embodiments of the invention in which an exclusive property or privilege is claimed are defined as follows:

1. A method for determining a roadway plane in a surrounding area of a vehicle, wherein the vehicle has a stereo camera system for capturing stereo images of the surrounding area of the vehicle and a trained artificial neural network for processing the image information provided by the stereo camera system, the method comprising:
by the trained artificial neural network, determining disparity information of the surrounding area of the vehicle;
by the trained artificial neural network, on the basis of the disparity information, calculating distance information, which contains information relating to the distance of objects displayed on the image information from the stereo camera system or the vehicle;
extracting roadway distance information from the distance information, wherein a roadway surface captured in the stereo images is represented by the roadway distance information; and
while the vehicle is in operation, determining the roadway plane on the basis of the roadway distance information by placing an assumed roadway plane that approximates the roadway surface represented by the roadway distance information in such a way that the total error resulting between the assumed roadway plane and the roadway distance information is minimized.

2. The method according to claim 1, wherein the extraction of the roadway distance information from the distance information is performed on the basis of object information that is provided by an environment model of a driving assistance system of the vehicle.

3. The method according to claim 1, wherein the extraction of the roadway distance information from the distance information is performed by subtracting or eliminating information included in an environment model of a driving assistance system of the vehicle from information included in a stereo image or from the distance information contained in the stereo image.

4. The method according to claim 1, wherein the trained artificial neural network compensates for calibration inaccuracies resulting from a relative movement of the two cameras of the stereo camera system with respect to one another by a nonlinear correlation of the image information.

5. The method according to claim 1, further comprising checking on the basis of the roadway plane whether objects are present on the roadway in the surrounding area of the vehicle.

6. The method according to claim 5, wherein the size of an object or the height of an object in the roadway area is checked on the basis of the information relating to the roadway plane.

7. The method according to claim 5 further comprising:
identifying an object on the roadway; and
determining height of the identified object, wherein, on the basis of the height of the identified object, the object is classified.

8. The method according to claim 1, wherein the trained artificial neural network is retrained on the basis of information from stereo images acquired while the vehicle is in motion and which are labeled as information associated with the roadway.

9. The method according to claim 1, wherein the trained artificial neural network provides the disparity information and the calculation of the distance information from the disparity information is performed in a separate computing unit, or the trained artificial neural network provides the distance information as output information.

10. A system for identifying a roadway plane in a surrounding area of a vehicle, comprising:
a stereo camera system for capturing stereo images of the surrounding area of the vehicle; and
a trained artificial neural network for processing the image information provided by the stereo camera system,
wherein the trained artificial neural network is configured to determine disparity information of the surrounding area of the vehicle,
wherein the trained artificial neural network is configured to calculate, on the basis of the disparity information, distance information which contains information regarding the distance of objects displayed on the image information from the stereo camera system or the vehicle,
wherein the trained artificial neural network or a computing unit provided separately from the trained artificial neural network is configured to
extract roadway distance information from the distance information, wherein a roadway surface captured in the stereo images is represented by the roadway distance information, and while the vehicle is in operation, determine the roadway plane from the roadway distance information by placing an assumed roadway plane that approximates the roadway surface represented by the roadway distance information in such a way that the total error resulting between the assumed roadway plane and the roadway distance information is minimized.

11. The system according to claim 10, wherein the system is configured to receive object information provided by an environment model of a driving assistance system of the vehicle and in that the system is designed to extract the roadway distance information from the distance information on the basis of the object information.

12. The system according to claim 10, wherein the system is configured to extract the roadway distance information from the distance information by subtracting and/or eliminating information included in an environment model of a driving assistance system of the vehicle from information included in a stereo image or from the distance information contained in the stereo image.

13. The system according to claim 10, wherein the system is configured to check, on the basis of the roadway plane, whether objects are present on the roadway in the surrounding area of the vehicle.

14. The system according to claim 13, wherein the system is configured to check, on the basis of the roadway plane, the size of an object or the height of an object in the roadway area.

15. A vehicle comprising a system according to claim 10.

16. The system according to claim 10, wherein the stereo camera system comprises inertial sensors configured to detect movement of cameras in the stereo camera system, and wherein measurement data from the inertial sensors is used to train the artificial neural network such that weighting factors of the artificial neural network and calculation of the distance information are adjusted based on changed orientation of the cameras.

* * * * *